US009635814B2

United States Patent
Kraus

(10) Patent No.: US 9,635,814 B2
(45) Date of Patent: May 2, 2017

(54) STRATEGIC CROP PLACEMENT USING A VIRTUAL TRIP LINE FOR A HARVESTER AND CROP ACCUMULATOR COMBINATION

(71) Applicant: DEERE & COMPANY, Moline, IL (US)

(72) Inventor: Timothy J Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/333,669

(22) Filed: Jul. 17, 2014

(65) Prior Publication Data

US 2016/0014971 A1    Jan. 21, 2016

(51) Int. Cl.
| | | |
|---|---|---|
| G06F 7/70 | (2006.01) |
| G06F 19/00 | (2011.01) |
| G06G 7/00 | (2006.01) |
| G06G 7/76 | (2006.01) |
| A01F 15/08 | (2006.01) |
| A01D 85/00 | (2006.01) |
| A01F 15/07 | (2006.01) |

(52) U.S. Cl.
CPC .......... *A01F 15/0883* (2013.01); *A01D 85/00* (2013.01); *A01D 85/005* (2013.01); *A01F 15/0765* (2013.01); *A01F 15/0875* (2013.01); *A01D 2085/007* (2013.01); *A01D 2085/008* (2013.01)

(58) Field of Classification Search
None
See application file for complete search history.

(56) References Cited

U.S. PATENT DOCUMENTS

| | | | |
|---|---|---|---|
| 4,844,675 A | | 7/1989 | Strosser et al. |
| 5,224,323 A | * | 7/1993 | Fykse .................... A01F 15/071 |
| | | | 53/211 |
| 6,292,729 B2 | | 9/2001 | Falck et al. |

(Continued)

FOREIGN PATENT DOCUMENTS

| | | |
|---|---|---|
| CA | 2709397 A1 | 5/2000 |
| FR | 2679410 A1 | 1/1993 |

(Continued)

OTHER PUBLICATIONS

European Search Report in foreign counterpart application No. 15176515.3 dated Dec. 18, 2015 (6 pages).

(Continued)

*Primary Examiner* — John R Olszewski
*Assistant Examiner* — Tommy Worden

(57) ABSTRACT

A harvester and a crop accumulator combination. The harvester is configured to transfer a harvested crop to the crop accumulator. The crop accumulator comprises at least one actuator to selectively discharge the harvested crops onto a field. A GPS unit is configured with at least one virtual trip line. An ECU is in communication with the GPS unit. The ECU is configured to selectively command the actuator of the crop accumulator to discharge harvested crop onto the field when the ECU receives a signal from the GPS unit when at least one of the virtual trip line is being approached, the virtual trip line is being crossed, and the virtual trip line has been crossed.

30 Claims, 4 Drawing Sheets

(56) References Cited

U.S. PATENT DOCUMENTS

| | | | |
|---|---|---|---|
| 7,000,533 B2 | 2/2006 | Derscheid et al. | |
| 7,401,547 B2 | 7/2008 | Degen | |
| 9,150,104 B2 | 10/2015 | Kellum | |
| 2003/0217539 A1* | 11/2003 | Grossjohann | A01D 43/087 56/153 |
| 2004/0116169 A1* | 6/2004 | Isfort | A01D 43/087 460/119 |
| 2004/0173435 A1* | 9/2004 | Vogelgesang | A01D 43/087 198/317 |
| 2005/0069405 A1* | 3/2005 | McGinnes | A01D 87/127 414/722 |
| 2006/0086263 A1* | 4/2006 | Degen | A01F 15/08 100/88 |
| 2007/0037621 A1* | 2/2007 | Isfort | A01D 43/086 460/114 |
| 2011/0023435 A1* | 2/2011 | Matousek | A01F 15/0825 56/341 |
| 2015/0216125 A1* | 8/2015 | Olander | A01F 15/07 701/50 |

FOREIGN PATENT DOCUMENTS

| | | | |
|---|---|---|---|
| JP | 2003143927 A | 5/2003 | |
| PL | 158422 B1 | 9/1992 | |
| WO | 2014031355 A1 | 2/2014 | |

OTHER PUBLICATIONS

Deere & Company, intelligent Total Equipment Control Pro setup guide, created Nov. 18, 2009, 55 pages, retrieved from http://www.deere.com/common/docs/stellar/en_US/Agriculture/Ag_Management_Solutions/Guidance_and_Machine_Control/pdf/iTEC_ProSetupGuide.pdf, USA.

PhiBer Manufacturing Inc., PhiBer Big Bale Accumulator Parts Manual, Issued Mar. 2015, 67 pages, retrieved from http://www.phiber.ca/wp-content/uploads/2015/03/AC3104-4104-PARTS-MANUAL-BAx1929-2182-DOC-100551-R2.pdf, Canada.

Deere & Company, Controls, Implement Management System (IMS), last updated Jul. 25, 2013, 1 page, retrieved from http://salesmanual.deere.com/sales/salesmanual/en_NA/tractors/2010/feature/operator-stat>, USA.

Deere & Company, GreenStar 2 iTEC Pro Quick Reference Guide, copyright 2010, 4 pages, retrieved from http://www.deere.com/common/docs/stellar/en_US/Agriculture/Ag_Management_Solutions/Guidance_and_Machine_Control/pdf/PFP10189_iTec_Pro.pdf, USA.

Deere & Company, iTEC Pro provides total equipment control, last updated Jul. 25, 2013, 1 page, retrieved from http://salesmanual.deere.com/sales/salesmanual/en/NA/ams/2011/feature/autotrac/itec_pro>, USA.

Deere & Company, Headland Management System (HMS) greatly reduces operator fatigue, last updated Jul. 25, 2013, 1 page, retrieved from http://salesmanual.deere.com/sales/salesmanual/en_NA/tractors/2013/feature/operator_stat>, USA.

\* cited by examiner

STRATEGIC CROP PLACEMENT USING A VIRTUAL TRIP LINE FOR A HARVESTER AND CROP ACCUMULATOR COMBINATION

FIELD OF THE DISCLOSURE

The present disclosure generally relates to crop harvesting systems. More particularly this disclosure relates to crop harvesting systems employing a harvester and an accumulator for accumulating crop. Specifically, the disclosure relates to such a system wherein a virtual trip line is provided for depositing crop material at predetermined location(s).

BACKGROUND OF THE DISCLOSURE

One recognized problem with agricultural baling using round and/or square balers is that bales are typically discharged from the baler onto the field in a random fashion. This requires an operator to subsequently drive all over the field to collect the bales and relocate them to the final storage location. This approach is time consuming; it can cause additional soil compaction, potential crop damage, and excessive wear on the transport equipment.

Bale accumulators have been used to gather bales together in batches. When the accumulator is full, it is common to dump the harvested crop in the location where it is full.

SUMMARY OF THE DISCLOSURE

In one embodiment, a method for discharging a harvested crop from a crop accumulator is disclosed. At least one virtual trip line is established using a Global Positioning System ("GPS") unit, a laser sender and receiver, a buried wire, a light beam sender and receiver, a sonar sender and receiver, or other device. A harvest operation is commenced. The harvested crop is transferred to the crop accumulator. It is communicated that at least one of the virtual trip line is being approached, the virtual trip line is being crossed, and the virtual trip line has been crossed. A discharge system of the crop accumulator is actuated in response to the communication to discharge a portion of the harvested crop or all of the harvested crop. The harvested crop is deposited on the virtual trip line, adjacent to the virtual trip line, in a zone defined by a predetermined distance from the virtual trip line, or outside of a zone defined by a predetermined distance from the virtual trip line.

In another embodiment, a harvester and a crop accumulator combination is disclosed. The harvester is configured to transfer a harvested crop to the crop accumulator. The crop accumulator comprises at least one actuator to selectively discharge the harvested crops onto a field. A GPS unit is configured with at least one virtual trip line. An Electronic Control Unit ("ECU") is in communication with the GPS unit. The ECU is configured to selectively command the actuator of the crop accumulator to discharge harvested crop onto the field when the ECU receives a signal from the GPS unit when the virtual trip line is being approached, the virtual trip line is being crossed, or the virtual trip line has been crossed.

In general a virtual trip line system is provided for automatically or manually activating a bale accumulator whenever the virtual trip line is crossed. The system consists of a GPS unit and an ECU that is coupled to the actuators that are used to tilt the accumulator cradle for dumping the bales. With this system, the operator defines a virtual trip line using a GPS unit and the GPS system then generates a 'virtual trip line' in the field. Every time the tractor/baler/accumulator combination drives across the virtual trip line, the accumulator can be automatically actuated to dump all of the bales it has stored on it or alternatively an alarm is activated to allow the operator to manually actuate the accumulator when the virtual trip line is crossed. The end result is that the bales are deposited in a row that corresponds to the virtual trip line and yet the tractor/baler/accumulator does not have to be operated in a straight line but can follow a windrow as needed. Software can input the virtual trip line based on topography or other factors (e.g., soil compaction, predicted crop yield, actual crop yield).

Virtual trip lines can be of various widths. An operator can drop harvested crop on either side of a virtual trip line in order to park a truck in the middle of the virtual trip line and load from either side. A virtual trip line width range of 0-50 feet typically works well for trucks loading hay. Ranges above 60 feet work well for larger vehicles. Virtual trip lines can also be spaced at intervals based on actual crop yields or predicted crop yields.

While the embodiment described in detail below relates to a round baler and bale accumulator combination it is contemplated that the virtual trip line can be used in conjunction with other harvester and accumulator combinations.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
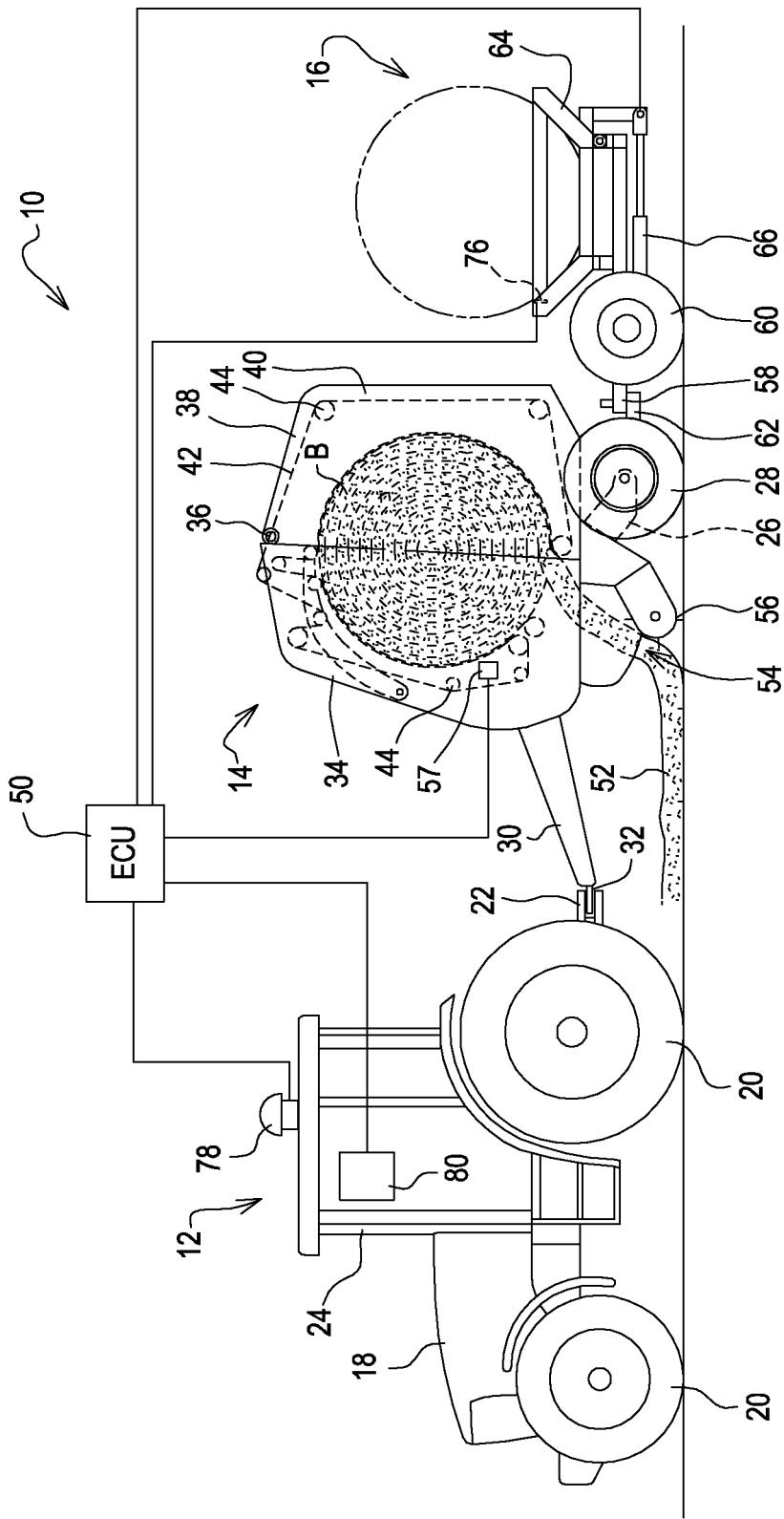
FIG. 1 is a partial schematic side view of a tractor-baler-bale accumulator combination.

FIG. 1 illustrates a tractor-baler-bale accumulator combination 10 according to one embodiment. The tractor-baler-bale accumulator combination 10 includes a tractor 12, a baler 14, and a bale accumulator 16. The tractor 12 has a frame 18 supported on wheels 20, at least one of which is driven by a prime mover, such as a diesel engine, through a powertrain (not shown). The tractor 12 further includes a hitch and/or drawbar 22 and an operator station 24.

The baler 14 has a main frame 26 supported on a pair of ground wheels 28. A draft tongue 30 has a rear end joined to the frame 26 and has a forward end defined by a clevis arrangement 32 adapted for being coupled to the drawbar 22 of the tractor 12. A pair of upright side walls 34 are fixed to the main frame 26 and define forward regions of opposite side walls of a baling chamber. Mounted for pivoting vertically about a horizontal pivot arrangement 36 located at an upper rear location of the side walls 34 is a discharge gate 38 including opposite upright side walls 40, which define opposite sides of a rear region of the baling chamber. A gate cylinder arrangement (not shown) is coupled between the main frame 26 and the opposite side walls 40 of the discharge gate 38 and is selectively operable for moving the discharge gate 38 between a closed baling position and an opened discharge position. Baler 14 as shown is of a variable size chamber design and thus comprises a plurality of longitudinally extending side-by-side belts 42 supported on a plurality of rollers 44 (only a few of which are shown). A bale forming chamber is defined by the sidewalls 34, 40, the rollers 44 and belts 42.

At least one ECU 50 is provided for electronically controlling the functions of the baler 12 and the accumulator 16. The ECU 50 is configured to receive signals from various sensors on the baler and accumulator (e.g., determining bale diameter, bale shape, bale weight) and for initiating various baler functions (e.g., tying or wrapping cycle, bale ejection, unloading of the accumulator). More particularly, it should be understood that the ECU is configured to provide a signal for actuation of various actuators on the accumulator to among other things discharge bales therefrom only if a bale is present.

In its general operation, the baler 14 is drawn through a field by the tractor 12 attached to the tongue 30. Crop material 52 is fed into a crop inlet 54 of the bale forming chamber from a windrow of crop on the ground by a pickup 56. In the baler 14, the crop material 52 is rolled in spiral fashion into a cylindrical bale B. Upon completion, the bale B is wrapped with twine or other appropriate wrapping material and is discharged by actuation of gate cylinders that open gate 38 permitting the completed cylindrical bale B to be discharged from the baler 14 onto the bale accumulator 16. The baler 14 may further be equipped with means for determining when the bale is in an ejection cycle. Such means could be in the form of sensors 57 associated with one or more of the twine or net wrapping system of the baler 14, the gate, the gate latch, the belt tensioning system etc. all of which could provide an indication of completion of a bale, as is well known in the art. The baler 14 illustrated is shown as an example only, it being understood that the baler 14 could be of any number of configurations including but not limited to fixed chamber round balers, small square balers, and large square balers.

Figure 2:
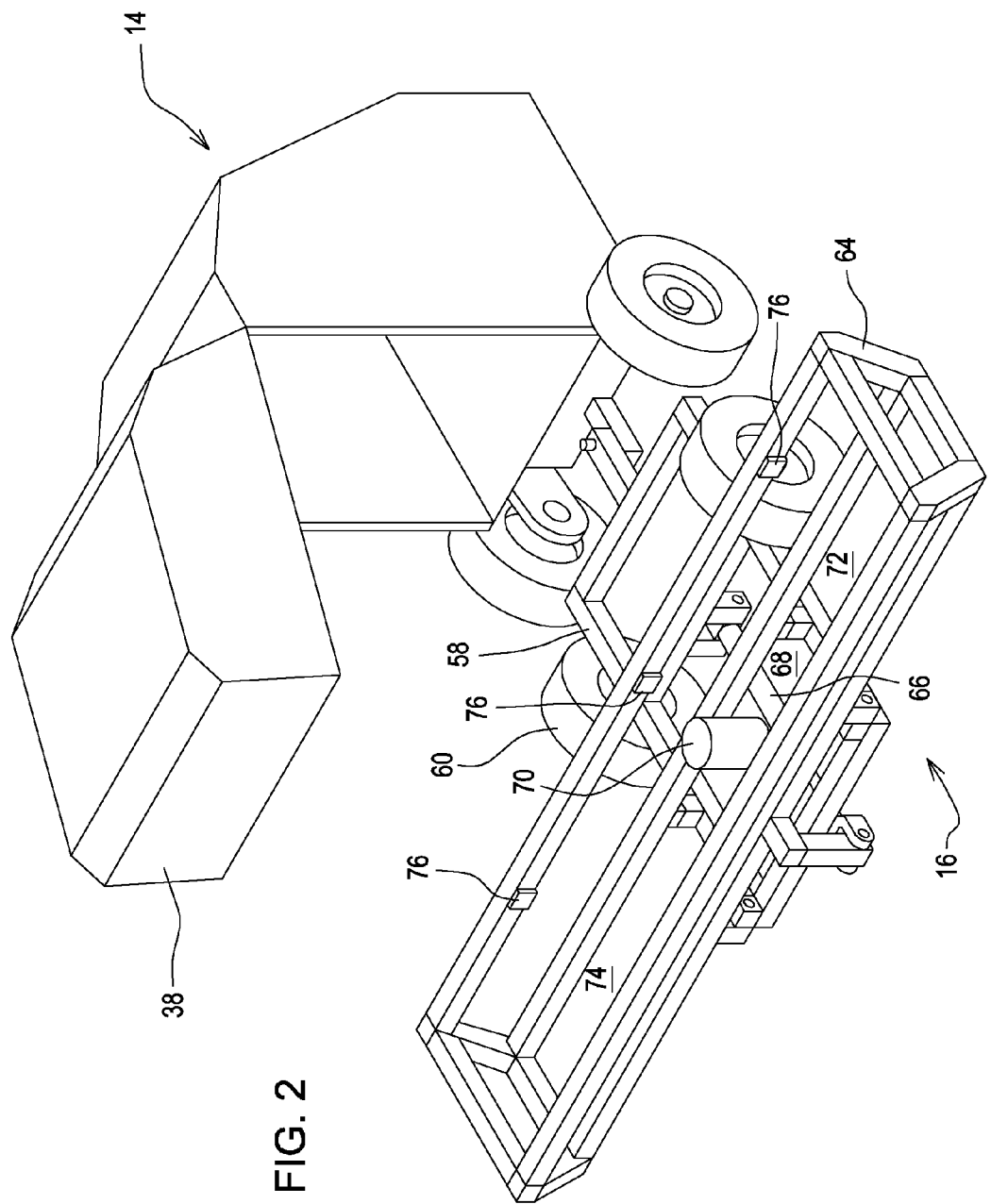
FIG. 2 is a partial schematic side view of the combination of FIG. 1 showing enlarged detail of the baler and bale accumulator.

Referring to FIGS. 1 and 2, the bale accumulator 16 has a main frame 58 supported on ground wheels 60. One or more draft elements 62 are provided at an end of the main frame 58 for attaching the bale accumulator 16 to the baler 14 in a towed fashion. The bale accumulator 16 is provided with a bale cradle 64 pivotally affixed to the frame 58. The bale cradle 64 is provided with one or more actuators 66 to raise the forward portion of the cradle 64 relative to the frame 58 to allow the bales to roll rearwardly and off the cradle 64 when the bale accumulator 16 is being unloaded. These actuators 66 may be in the form of hydraulic, electric, pneumatic or other like configurations and are selectively controlled in response to signals received from the ECU 50. The particular round bale accumulator 16 shown receives a completed cylindrical bale B from the baler 14 at a center position 68 (FIG. 2). Depending upon whether or not the other positions on the bale accumulator 16 are occupied, the bale accumulator 16, by way of the ECU 50, selectively utilizes actuators 70 to translate the bale from the first center position 68 to either the second 72 or third 74 positions left and right of the center position respectively. Again it should be noted that the actuators 70 could be of any known configuration (e.g., electric, hydraulic, pneumatic). Accordingly when the bale accumulator 16 is full, three bales are aligned side-by-side on the cradle 64 and can be simultaneously discharged onto the ground in the same side-by-side configuration.

It is contemplated that the bale accumulator 16 could be provided with sensors 76 of various known configurations (e.g., electro-mechanical switches, non-contact sensors, load cells) for determining whether or not a bale is present on the bale accumulator 16 and at which position. The output of such sensors 76 can be connected to the ECU 50 for purposes which will become apparent as the description continues. It should also be noted that it is possible to unload the bale accumulator 16 when it has fewer than three bales on it. Likewise it would be conceivable to provide a bale accumulator 16 wherein individual bales could be discharged selectively by providing a multi-part cradle having individual actuators for each part. The bale accumulator 16 illustrated is just one example of a bale accumulator 16 capable of carrying three round bales. It is however, contemplated that the bale accumulator 16 could be of any number of shapes, sizes, capacities and configurations for accumulating a plurality of bales of various shapes and sizes such as round, small square and large square bales.

The tractor-baler-bale accumulator combination 10 is further provided with a GPS receiver 78 in wired or wireless communication with the ECU 50 which is, in turn, connected to a display 80 in the operator station 24 of the tractor 12. Alternatively a standalone GPS unit could be provided having a dedicated ECU and display or a cellular phone with GPS capabilities and/or software or a laser sender and receiver, a buried wire, a light beam sender and receiver, a sonar sender and receiver, or other device. For purposes of this disclosure such a standalone GPS unit requires at least a wired or wireless output capable of communicating with the baler 14 and bale accumulator 16 ECU 50.

The operation of the system and method of the disclosure will now be described with reference to FIGS. 3 and 4. Prior to commencing a baling operation an operator will determine the desired location(s) where he/she would like to deposit bales for later recovery and storage. Selection of the deposit location(s) is generally made for the convenience of the operator considering, for example, such factors as the need to reduce soil compaction by reducing traffic on the field, proximity to the storage location, and the topography of the terrain (e.g., the desirability of depositing bales at the top or bottom of a hill rather than on the side of a hill, the desirability of depositing bales at the headlands, along ditches or grass waterways). The number and frequency of deposit locations along the baling path(s) is also limited by the crop yield versus the capacity of the accumulator. In other words, if a particular field or portion of a field has a higher yield of crop material, more crop will be fed into the baler per unit traveled and thus more bales will be completed over a shorter distance, thereby necessitating the establishment of virtual trip lines that are closer together. Crop yield for a particular field and crop could be determined from historic yield data to generate a predicted crop yield or, for example, during the baling operation by monitoring the flow of crop into the baler using appropriate sensors and/or by monitoring the number of bales being produced per unit of distance an actual crop yield could be used. Once the operator has determined the desired deposit location(s) he or she will set in the GPS unit 78 a virtual trip line.

Figure 3:
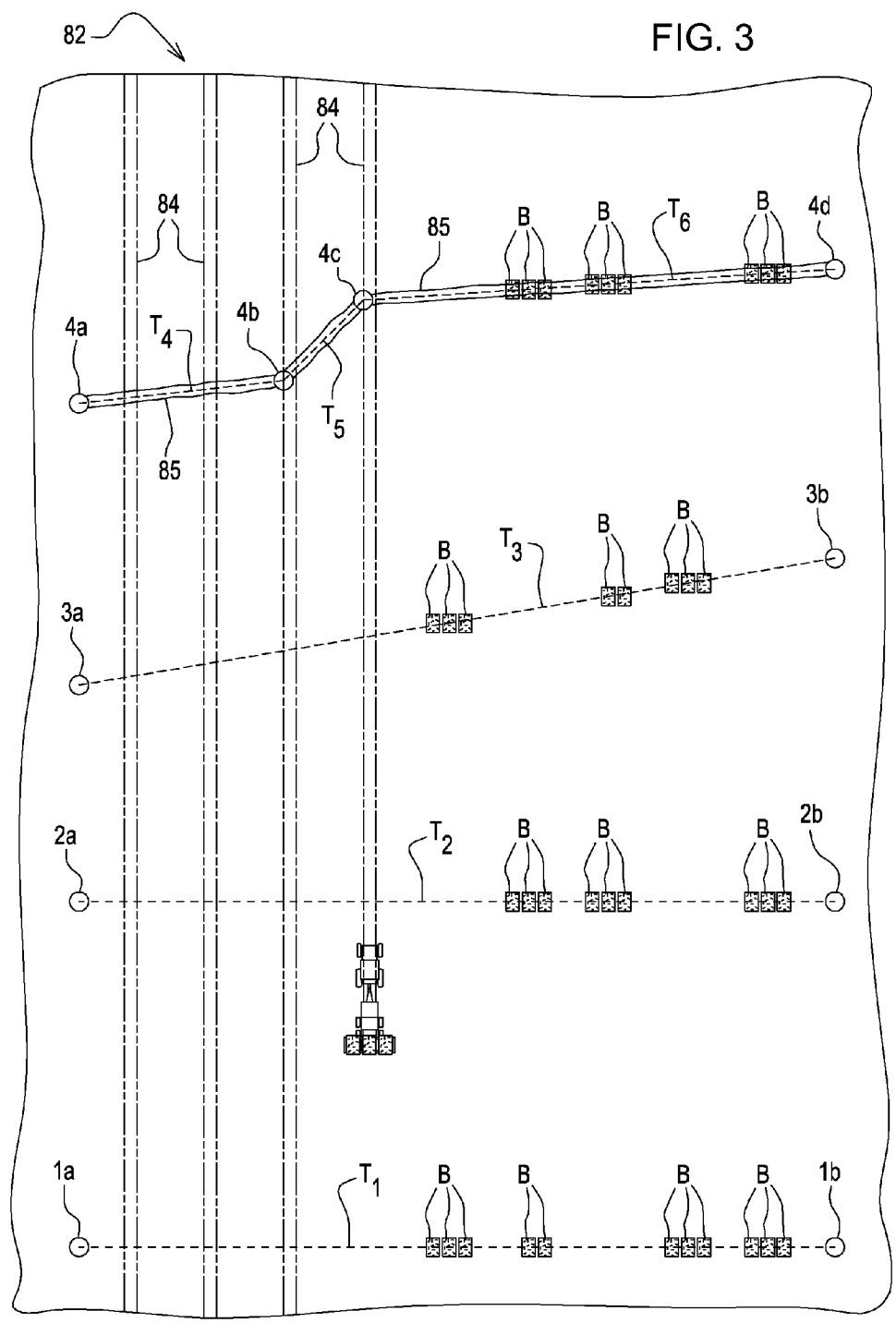
FIG. 3 is a plan view of a crop field wherein the virtual trip lines according to the disclosure are employed.

As shown in FIG. 3, an exemplary crop field 82 has a plurality of crop windrows 84 from which crop material will be baled. The operator has set between points 1a and 1b a first virtual trip line $T_1$. Additional trip lines $T_2$, $T_3$, $T_4$, $T_5$, and $T_6$ are also established between points 2a and 2b, 3a and 3b, 4a and 4b, 4b and 4c, and 4d and 4e, respectively. From the illustration it will be evident that the virtual trip lines can be established generally perpendicular to the windrows 84 as shown in the illustration of trip line $T_1$ or they can be established at various angles to the windrows as shown in the illustration of trip line $T_3$. Further it will be noted with reference to virtual trip lines $T_4$, $T_5$, and $T_6$ that a single virtual trip line need not cross the entire field and that virtual trip lines T can be created to align with terrain topography or for other reasons. More particularly it can be seen that a virtual trip line $T_4$ is established between points 4a and 4b, an additional virtual trip line $T_5$ connects points 4b with 4c, and a further virtual trip line $T_6$ connects points 4d and 4e to generally form a multi-angled virtual trip line across the entire field to follow for example, a topographical contour such as a grass waterway 85. Therefore, an operator can follow a windrow and not worry about traveling in a straight line to still cross the virtual trip lines T.

With the virtual trip lines T set it should be apparent that the system can be configured, as described in further detail below, to automatically deposit onto the field any bales present on the accumulator at the time the virtual trip line is crossed. This is generally accomplished through communication of the GPS receiver 78 with the ECU 50 which in turn commands actuation of the accumulator actuators 66 to pivot the accumulator cradle 64 to discharge the bales when a signal has been received from the GPS receiver 78 that a virtual trip line T has been crossed.

Figure 4:
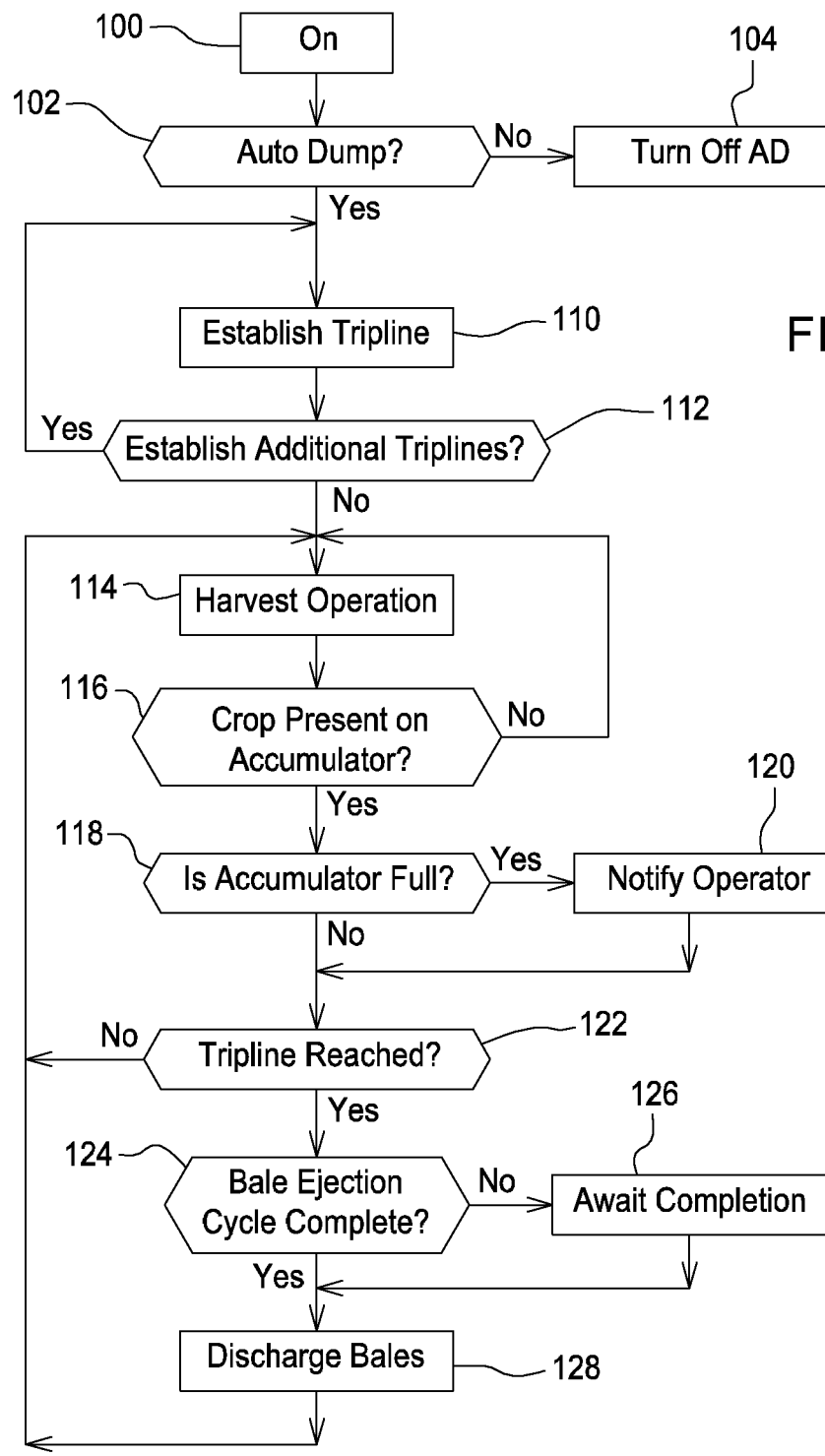
FIG. 4 is a flowchart depicting the control logic for activating the accumulator relative to the virtual trip line.

With reference to the flowchart of FIG. 4 it can be seen that the logic for the virtual trip line system begins at 100 when the system is turned on. Next at 102 the operator selects whether to commence the baling operation in "auto dump" mode wherein bales will be automatically discharged or dumped from the accumulator whenever a virtual trip line is crossed. If not, the "auto dump" feature is turned off at 104. If the answer at 102 is "yes", then the operator establishes a first virtual trip line that is stored in memory at 110. Next at 112 it is determined whether additional trip lines are desired. If the answer at 112 is "yes" the logic loops back to 110 wherein additional trip lines will be established and stored. If at 112 the answer is "no", then at 114 the baling operation is commenced. At 116 the logic determines whether a completed bale is present on the accumulator. If at 116 the answer is "no" the logic loops back to 114. If at 116 the answer is "yes" the logic proceeds to 118 wherein it is determined whether the accumulator is full. If the answer at 118 is "yes" a notification is sent at 120 to the operator by way of a visual or audible alarm so that the operator can make a decision as to whether to establish additional trip lines, to deposit the bales onto the field at the present location, or to transport the bales to another location for deposit. If however, at 118 the answer is "no" then the logic proceeds to 122 wherein it is determined whether a virtual trip line has been reached.

Here it should be noted that the determination as to whether there are bales present on the accumulator and whether the accumulator is full can be made in various ways. As mentioned above, the accumulator can be configured with sensors 76 that communicate with the ECU 50 to indicate the presence of bales on the accumulator. Alternatively, it is contemplated that in lieu of or in addition to the sensors it is possible to keep in the ECU 50 a running count of total bales completed and more particularly the number of bales completed since the accumulator 16 was last dumped.

If at 122 the answer is "no" the logic again loops back to 114. If the answer at 122 is "yes" it is determined at 124 whether the baler has completed the process of ejecting a bale onto the accumulator. If the answer at 124 is "no" the system awaits the completion of the ejection cycle at 126 and then proceeds to 128. If the answer at 124 is "yes" then the logic immediately steps to 128 wherein the bales are deposited on the field. It should be noted that steps 124 and 126 of the logic are only needed for non-continuous balers such as conventional round balers wherein the baling process is temporarily halted during the ejection cycle. In such systems it is undesirable to open the rear gate of the baler while the accumulator is being dumped and vice-versa due to possible interference of the gate with the accumulator cradle. For large and small square balers and/or continuous round balers steps 124 and 126 may not be necessary. After 128 the logic reverts to 114.

In view of the foregoing it can be seen that the disclosure provides a method and apparatus for automatically dumping accumulated bales at predetermined locations. More particularly, as the baling operation progresses up and down the windrows of crop the tractor-baler-bale accumulator combination periodically crosses the pre-set virtual trip lines at which time any bales present on the accumulator are deposited on the ground. This method results in bales being located closer together at the deposit locations of the operator's choosing resulting in more convenient and efficient retrieval of bales during the collection and storage operation. Time needed for bale collection is reduced, thus also reducing the operating time and wear and tear on equipment. Additionally soil compaction and crop damage can be reduced by utilizing the system to reduce traffic on the field during bale collection. The system is compatible with conventional baling equipment and techniques in that it allows the operator to utilize conventional balers and accumulators and to perform the baling operation without the need to deviate from the windrow during baling to deposit bales at more advantageous locations inasmuch as this is performed automatically as the pre-determined virtual trip lines are crossed.

Various features are set forth in the following claims.

What is claimed is:

1. A method for discharging one or more bales from a crop accumulator, the method comprising:
   establishing at least one virtual trip line, defined by a line;
   commencing a harvest operation with a baler;
   transferring one or more bales from the baler to the crop accumulator one at a time;
   communicating that at least one of: the virtual trip line is being approached, the virtual trip line is being crossed, and the virtual trip line has been crossed;
   determining whether the transfer of each bale from the baler to the crop accumulator is complete by using a sensor associated with one of the baler and the crop accumulator;
   temporarily pausing the transfer of any remaining bales from the baler to the crop accumulator until the transfer of the previously transferred bale from the baler to the crop accumulator is complete;
   actuating a discharge system of the crop accumulator, in response to the communication, to selectively discharge one of: one bale and more than one bale; and
   depositing the one or more bales substantially on the virtual trip line.

2. The method of claim 1, wherein the step of establishing at least one virtual trip line is accomplished by using at least one of: a GPS unit, a laser sender and receiver, a buried wire, a light beam sender and receiver, and a sonar sender and receiver.

3. The method of claim 1 further comprising determining if the one or more bales are present on the crop accumulator prior to actuating the discharge system.

4. The method of claim 1 further comprising determining if the crop accumulator is full before the virtual trip line has been crossed.

5. The method of claim 1 further comprising monitoring the presence of one or more bales on the crop accumulator using at least one sensor on the crop accumulator.

6. The method of claim 1 further comprising monitoring the presence of one or more bales on the crop accumulator by keeping an account of the amount of bales on the crop accumulator since the crop accumulator was last discharged.

7. The method of claim 1 further comprising providing at least one of: an audible signal and a visual signal to an operator that the crop accumulator is full and that the virtual trip line has not yet been crossed.

8. The method of claim 1 further comprising awaiting the completion of the harvesting operation prior to actuating the discharge system.

9. The method of claim 1 further comprising establishing the trip line based upon at least one of: proximity to a storage location and a topography of a field.

10. The method of claim 1 further comprising establishing intervals between virtual trip lines based upon one of: an actual crop yield and a predicted crop yield.

11. The method of claim 10 further comprising determining the predicted crop yield based upon a historical yield data for a field and a type of crop.

12. The method of claim 10 further comprising determining the actual crop yield based upon a sensed rate of crop flow during the harvest operation.

13. The method of claim 10 further comprising determining the actual crop yield based upon an amount of bales produced per unit of travel over the field.

14. The method of claim 1, wherein the step of depositing the one or more bales includes depositing a plurality of bales in a side-by-side orientation onto the ground generally perpendicular to the direction of travel of the harvest operation.

15. The method of claim 1, wherein the step of determining whether the transfer from the baler to the crop accumulator is complete uses a sensor associated with the baler.

16. The method of claim 1, wherein the step of determining whether the transfer from the baler to the crop accumulator is complete uses a sensor associated with the crop accumulator.

17. The method of claim 1, wherein the step of determining whether the transfer from the baler to the crop accumulator is complete uses sensors associated with the baler and the crop accumulator.

18. A method for discharging a plurality of round bales from a crop accumulator, the method comprising:
    establishing at least one virtual trip line, defined by a line;
    commencing a harvest operation with a baler;
    transferring the plurality of round bales from the baler to the crop accumulator one at a time, wherein the transfer of each bale from the baler to the crop accumulator is determined complete by using a sensor associated with one of the baler and the crop accumulator, and the transfer of each bale is temporarily paused until the transfer of the previously transferred bale from the baler to the crop accumulator is determined complete;
    communicating that at least one of: the virtual trip line is being approached, the virtual trip line is being crossed, and the virtual trip line has been crossed;
    actuating a discharge system of the crop accumulator, in response to the communication, to simultaneously discharge the plurality of round bales in a side-by-side orientation onto the ground generally perpendicular to the direction of travel of the harvest operation; and
    depositing the plurality of round bales substantially on the virtual trip line.

19. The method of claim 18, wherein the step of establishing at least one virtual trip line is accomplished by using at least one of: a GPS unit, a laser sender and receiver, a buried wire, a light beam sender and receiver, and a sonar sender and receiver.

20. The method of claim 18 further comprising determining if the plurality of round bales are present on the crop accumulator prior to actuating the discharge system.

21. The method of claim 18 further comprising determining if the crop accumulator is full before the virtual trip line has been crossed.

22. The method of claim 18 further comprising monitoring the presence of the plurality of round bales on the crop accumulator using at least one sensor on the crop accumulator.

23. The method of claim 18 further comprising monitoring the presence of the plurality of round bales on the crop accumulator by keeping an account of the amount of bales on the crop accumulator since the crop accumulator was last discharged.

24. The method of claim 18 further comprising providing at least one of: an audible signal and a visual signal to an operator that the crop accumulator is full and that the virtual trip line has not yet been crossed.

25. The method of claim 18 further comprising awaiting the completion of the harvesting operation prior to actuating the discharge system.

26. The method of claim 18 further comprising establishing the trip line based upon at least one of: proximity to a storage location and a topography of a field.

27. The method of claim 18 further comprising establishing intervals between virtual trip lines based upon one of: an actual crop yield and a predicted crop yield.

28. The method of claim 27 further comprising determining the predicted crop yield based upon a historical yield data for a field and a type of crop.

29. The method of claim 27 further comprising determining the actual crop yield based upon a sensed rate of crop flow during the harvest operation.

30. The method of claim 27 further comprising determining the actual crop yield based upon an amount of bales produced per unit of travel over the field.

* * * * *